United States Patent
Gao et al.

(10) Patent No.: US 12,242,879 B2
(45) Date of Patent: Mar. 4, 2025

(54) PROTECTING CONTAINER IMAGES AND RUNTIME DATA

(71) Applicant: International Business Machines Corporation, Armonk, NY (US)

(72) Inventors: Wen Yi Gao, Beijing (CN); Qi Feng Huo, Beijing (CN); Si Bo Niu, Beijing (CN); Sen Wang, Beijing (CN); Dan Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 17/858,120

(22) Filed: Jul. 6, 2022

(65) Prior Publication Data

US 2024/0012666 A1 Jan. 11, 2024

(51) Int. Cl.
*G06F 9/455* (2018.01)
*G06F 21/60* (2013.01)
*H04L 9/06* (2006.01)

(52) U.S. Cl.
CPC ........ *G06F 9/45558* (2013.01); *G06F 21/602* (2013.01); *H04L 9/0643* (2013.01); *G06F 2009/45587* (2013.01)

(58) Field of Classification Search
CPC ............... G06F 9/45558; G06F 21/602; G06F 2009/45587; G06F 21/53; H04L 9/0643; H04L 9/0894
See application file for complete search history.

(56) References Cited

U.S. PATENT DOCUMENTS 10,154,065 B1 12/2018 Buchler
10,552,172 B2 * 2/2020 Li .................. G06F 16/119
(Continued)

FOREIGN PATENT DOCUMENTS

CN 110990119 A * 4/2020
CN 112579112 A * 3/2021 ........... G06F 21/602
(Continued)

OTHER PUBLICATIONS

Kalvin Eng & Abram Hindle, "Revisiting Dockerfiles in Open Source Software Over Time", 2021 IEEE/ACM 18th International Conference on Mining Software Repositories (MSR), Published: 2021 (Year: 2021).*

(Continued)

*Primary Examiner* — Carl G Colin
*Assistant Examiner* — Habibullah
(74) *Attorney, Agent, or Firm* — Nicholas A. Welling

(57) ABSTRACT

An approach for protecting container image and runtime data from host access may be presented. Container systems have allowed for more efficient utilization of computing resources, removing the requirement of a hypervisor, and packaging all necessary dependencies within an application. Preventing host access to container image and runtime data can be advantageous for a multitude of reasons. The approach herein may include, flattening a plurality of root file system of a one or more container images into a single layer. The approach may also include generating a container base image for each of the one or more flattened root file system. The approach may include encrypting each of the generated container base images with the flattened root file system.

11 Claims, 7 Drawing Sheets

(56) References Cited

U.S. PATENT DOCUMENTS

| | | | |
|---|---|---|---|
| 10,614,117 | B2 | 4/2020 | Chiba |
| 10,824,726 | B1* | 11/2020 | Herman Saffar ..... G06F 21/566 |
| 11,163,902 | B1 | 11/2021 | Clerget |
| 11,301,428 | B2* | 4/2022 | Weil .................... G06F 9/45558 |
| 11,522,915 | B2* | 12/2022 | Nimmagadda ..... H04L 63/0263 |
| 11,966,769 | B2* | 4/2024 | Hotinger ............. G06F 9/45558 |
| 2017/0300697 | A1* | 10/2017 | Iyer .......................... G06F 8/63 |
| 2018/0129803 | A1 | 5/2018 | Levin |
| 2018/0276215 | A1 | 9/2018 | Chiba |
| 2019/0114164 | A1* | 4/2019 | Wong ..................... G06F 8/658 |
| 2019/0392050 | A1* | 12/2019 | Weil .................... G06F 9/45558 |
| 2020/0250319 | A1* | 8/2020 | Bacher ................ G06F 9/45558 |
| 2020/0304526 | A1* | 9/2020 | Abraham ............. G06F 21/577 |
| 2021/0011885 | A1* | 1/2021 | Liu .......................... G06F 8/63 |
| 2021/0012011 | A1 | 1/2021 | Huang |
| 2021/0157623 | A1* | 5/2021 | Chandrashekar ..... G06F 9/5027 |
| 2021/0240671 | A1* | 8/2021 | Fong ..................... G06F 16/183 |
| 2022/0019452 | A1* | 1/2022 | Levin .................... G06F 9/5077 |
| 2022/0075760 | A1 | 3/2022 | Wu |
| 2022/0317987 | A1* | 10/2022 | Scrivano ............... G06F 16/196 |
| 2023/0214246 | A1* | 7/2023 | Darji .................... G06F 9/5077 718/1 |
| 2023/0412641 | A1* | 12/2023 | Watkiss ................ H04L 63/083 |

FOREIGN PATENT DOCUMENTS

| | | | | | |
|---|---|---|---|---|---|
| CN | 112860335 | A | * | 5/2021 | ........... G06F 21/107 |
| CN | 113383330 | A | * | 9/2021 | ............ G06F 16/116 |
| CN | 108369622 | B | * | 11/2021 | ......... G06F 21/1063 |
| CN | 114600082 | A | * | 6/2022 | ................ G06F 8/63 |
| WO | WO-2017106726 | A1 | * | 6/2017 | ......... G06F 21/1063 |
| WO | WO-2018129803 | A1 | * | 7/2018 | ............. B64C 27/08 |
| WO | WO-2021148144 | A1 | * | 7/2021 | ............. G06F 21/14 |

OTHER PUBLICATIONS

Lydia Parziale et al., Getting started with z/OS Container Extensions and Docker, IBM Redbooks, Published: Nov. 2019 (Year: 2019).*

International Searching Authority, "Notification of Transmittal of the International Search Report and the Written Opinion of the International Searching Authority, or the Declaration", File Reference EIE230354PCT, International application No. PCT/CN2023/093783, International Filing Date May 12, 2023, Mailed on Jun. 26, 2023, 7 pages.

Mell et al., "The NIST Definition of Cloud Computing", Recommendations of the National Institute of Standards and Technology, NIST Special Publication 800-145, Sep. 2011, 7 pages.

* cited by examiner

PROTECTING CONTAINER IMAGES AND RUNTIME DATA

BACKGROUND OF THE INVENTION

The present invention relates generally to the field of virtual machines, and more specifically, to protecting container images and container runtime data.

Virtual machines are widely used to create virtualization. VMs operate based on the computer architecture and functions of a real or hypothetical computer. A VM is a software implementation of a machine that executes programs like a physical machine. a single physical machine may support multiple VMs executed thereon and manage these VMs using a program called a "hypervisor." A hypervisor or virtual machine monitor (VMM) is a computer software, firmware, or hardware that creates and runs virtual machines. A computer on which a hypervisor runs one or more virtual machines is called a host machine, and each virtual machine is called a guest machine.

Containers provide lightweight virtualization that allows for isolating processes and/or resources without the need of providing instruction interpretation mechanisms and/or other complexities of full virtualization. Containers effectively partition the resources managed by a single host operating system into isolated groups to better balance the conflicting demands on resource usage between the isolated groups. The container technology allows sharing a common operating system and potentially binary files or libraries.

SUMMARY

Embodiments of the present disclosure include a computer-implemented method, a computer system, and a computer program product for protecting container images and runtime data. Embodiments of the invention may include retrieving one or more container images from a container registry, wherein the container images are based on a root file system comprised of one or more layers. Embodiments of the invention may further include flattening the root file system of each of the container images into a single layer. Embodiments of the invention may also include generating a container base image for each of the flattened container images. Additionally, embodiments of the invention may also include encrypting the each of the generated container base images.

It should be understood, the above summary is not intended to describe each illustrated embodiment of every implementation of the present disclosure.

Figure 1:
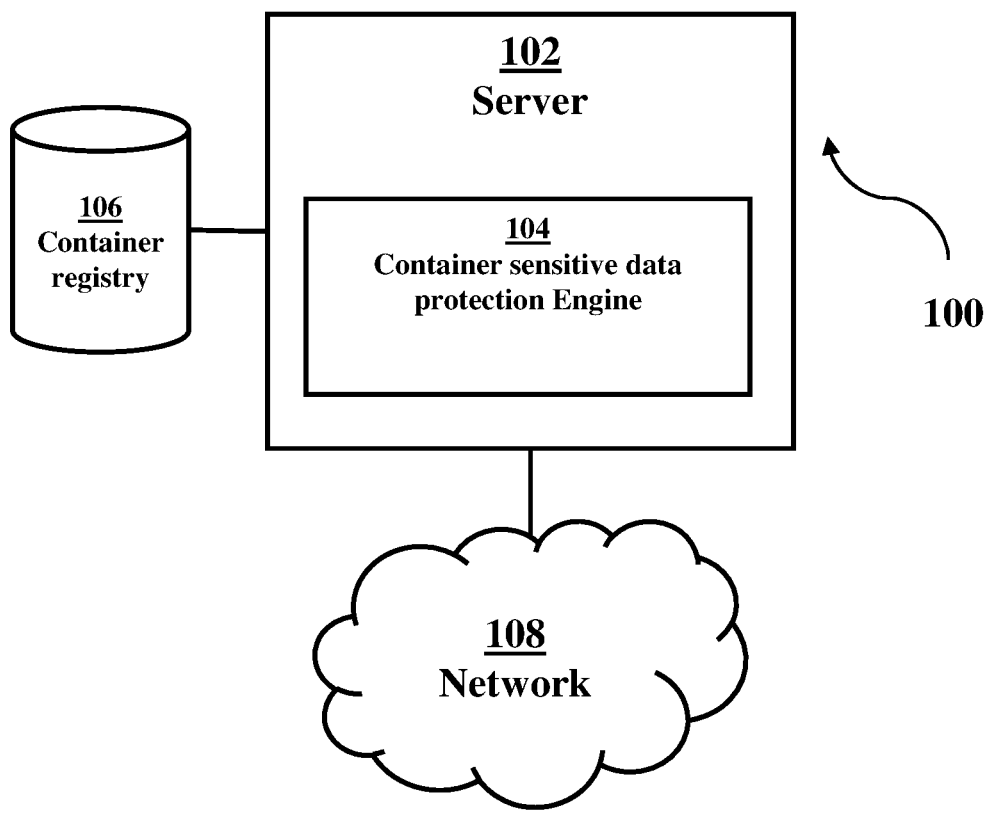
FIG. 1 is a functional block diagram of a container sensitive data protection system, generally designated 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Embodiments of the invention appreciate the need to protect container images and container runtime data. Protecting container images can be a critical need for confidential computing. In many instances there is a need to prevent access to container resources by other containers and container host. Some solutions exist to isolate resources such as processor activity, memory, and storage within container environments. For example, within a Kubernetes Pod, Kata and gVisor can restrict some access. However, existing solutions cannot prevent host access to a container image and the root filesystem of a container. This is because the container root filesystems reside under a directory on the host. Within this description a possible solution may be presented to prevent host access to a container image and/or the root filesystem. The solution may include an approach to protecting the container image and root filesystem from host access, while allowing the container image to be shared among a pod based on a sharing policy.

The use of "container" technology has gained traction in cloud computing environments, in large part because containers have many of the benefits of virtual machines, such as reduced physical infrastructure costs and better scalability and flexibility, without operating system multiplication and correspondingly higher resources overhead associated with virtual machines. This specification uses the term "container" to describe an aspect of the technology herein, however it will be appreciated that other terms for containers are known in the industry. For example, containers are sometimes referred to as Open Container initiative (OCI) containers, Kubernetes containers, Windows Server Containers, Hyper-V containers, Intel Clear Containers or Kata containers. Container technologies generally allow portable containers to run on one or more virtual machines or other operating systems. The containers are isolated and thus cannot interfere with each other or access each other's resources without permission. The term "container" as used herein is not limited to any particular type of container.

This specification uses the term "container engine" to describe another aspect of the technology herein, however it will be appreciated that other terms for container engines are known in the industry. Container engines generally provide runtime environments for containers which isolate the containers. "Docker" is an example of a widely used container engine. Container engines can generally include, among other things, a container daemon which provides an Application Programming Interface (API) and other features for use by containers. Container engines can also include execution logic responsible for starting, stopping, pausing, unpausing, and deleting containers. The term "container engine" as used herein is not limited to any particular type of container engine.

Containers are generally transmitted and stored as "container images," which can be stored in local or network registries. Container images can be tagged with any desired information. For example, a container can be identified by its 256 bit hash.

Containers may cooperate in a "swarm" of multiple cooperating containers. The swarm is a group of multiple cooperating or interrelated containers. The swarm can include containers at each of a group of nodes collaborating over a network. A service can run on a swarm rather than a single container. Each swarm has managers that dispatch tasks to workers and the managers can also serve as workers. The managers can select a leader which assigns tasks and re-assigns failed worker's tasks. Managers other than the leader can stand ready to elect a new leader if the previously selected leader fails. Using a swarm, services which employ containers can be scaled up and down as needed.

Containers employ a variety of security features. In general, container technologies provide container isolation so containers cannot interfere with each other, and cannot access each other's resources without permission. Further, container images, or portions thereof can be encrypted to protect container code and data while the container image is in storage in registries, or while the container image is being transmitted. However, once container images are downloaded to hosts with encryption keys, all container image content can be decrypted in plaintext and is susceptible to horizontal attacks and snooping of rogue administrators, that is, the root users of operating systems that run containers. Aspects of this disclosure provide security hardening measures which protect against such administrative access, thereby improving security of containers. Further, embodiments within this disclosure may provide an approach to protecting container images and root filesystems from host access, while allowing sharing of the container images consistent with a predefined or dynamic sharing policy.

Containers are often hosted on servers in cloud computing environments. It is to be understood that although this disclosure include a detailed description of cloud computing embodiments, implementation of the teachings recited herein are not limited to cloud computing environments. Rather, embodiments of the present disclosure are capable of being implemented in conjunction with any other type of computing environment now known or later developed.

The embodiments depicted herein may include an approach for protecting container applications and runtime data. In an embodiment, one or more container base images that have multiple layers can be retrieved from a container registry. For example, the container base images can be retrieved or pulled from a docker registry. In an embodiment, each container base image can be flattened into a single layer. For example, the containers retrieved can be based on a union filesystem. The union file system can have multiple layers in which the top layer is copy-on-write ("COW"). The COW layer includes any modifications or deletions to the lower layer immediately below the top layer. In an embodiment, a new container base image can be created from the flattened container base image. In an embodiment, the new container base image can be encrypted. Further, in an embodiment, multiple (e.g., 2, 3, n, . . . n+1) containers can be grouped together (e.g., as a Pod) and mounted by virtual machine Pods. The Pod can be considered a virtual machine from which an overlay image of the root file system for the Pod can be generated. An overlay image of the flattened container base images can also be generated. In an embodiment, the container base images can be managed securely based on a security policy. In an embodiment, the security policy can be based on, for example, the Pod, the deployment mechanism, and/or the namespace of the container environment.

Referring now to the Figures, FIG. 1 is a functional block diagram generally depicting container sensitive data protection system 100, in accordance with an embodiment of the invention. Container sensitive data protection system 100 comprises container sensitive data protection engine 104 operational on server 102 and container registry 106 stored on server 102. Also depicted in container sensitive data protection system 100 is network 108. In an alternative embodiment, container registry 106 can be located on a separate computational device, other than server 102 in communication with container sensitive data protection engine 104 via network 108.

Server 102 can be a standalone computing device, a management server, a web server, a mobile computing device, or any other electronic device or computing system capable of receiving, sending, and processing data. In other embodiments, server 102 can represent a server computing system utilizing multiple computers as a server system such as in cloud computing environment 50 (depicted in FIG. 6). In an embodiment, server 102 can represent a computing system utilizing clustered computers and components (e.g., database server computers, application server computers, etc.) that act as a single pool of seamless resources when accessed within container sensitive data protection system 100. In another embodiment, server 102 can be a laptop computer, a tablet computer, a netbook computer, a personal computer, a desktop computer, or any programmable electronic device or combination of programmable electronic devices capable of executing machine readable program instructions and communicating with each other, and other computing devices (not depicted) within container sensitive data protection system 100 via network 108. It should be noted, while only a single device is shown in FIG. 1 for server 102 in other embodiments, multiple servers or other computing devices can be present within container sensitive data protection system 100.

Figure 4:
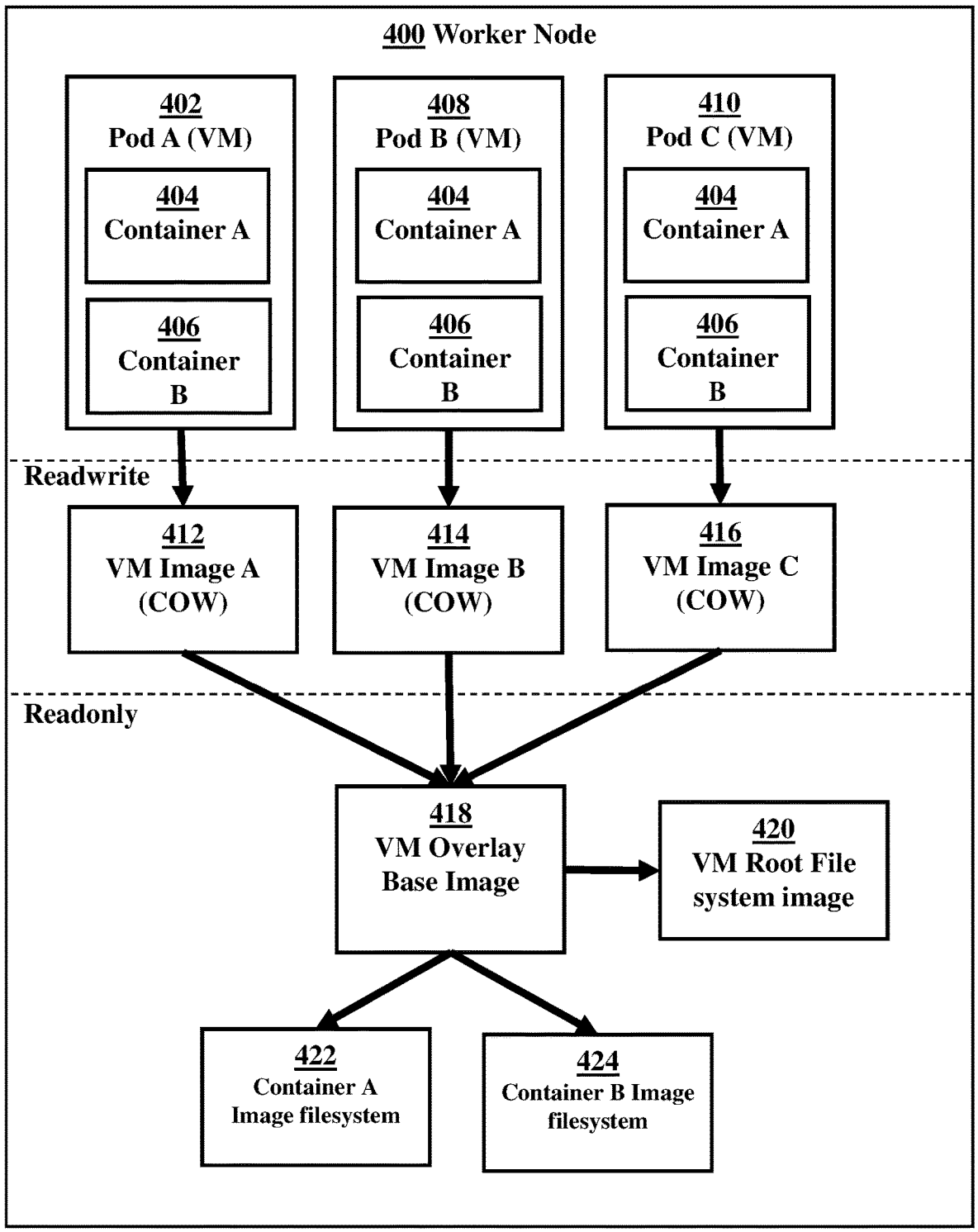
FIG. 4 is a block diagram of a virtual machine run with a virtual machine overlay base image within worker node 400, in accordance with an embodiment of the present invention.

Server 102 may include components as depicted and described in further detail with respect to computer system 10 in FIG. 4. Server 102 may include components as depicted and described in further detail with respect to cloud computing node 40 of cloud computing environment 50 in FIG. 6.

Network 108 can be a telecommunications network, a local area network (LAN), a wide area network (WAN), such as the Internet, or a combination of the three, and can include wired, wireless, or fiber optic connections. Network 108 may include one or more wired and/or wireless networks that are capable of receiving and transmitting data, voice, and/or video signals, including multimedia signals that include voice, data, and video information. In general, network 108 can be any combination of connections and protocols that will support communications between server 102, and external computing devices (not shown) within container sensitive data protection system 100.

Container sensitive data protection engine 104 is a computer program capable of security measures which prevent host access to container application data and root filesystem information. In an embodiment, container sensitive data protection engine 104 can have capabilities to retrieve or pull container images from a container repository (described further below). In an embodiment, security hardening measures can be instituted through a multitude of approaches by one or more modules present within container sensitive data protection engine 104. For example, multiple layers of a container image with a union file system can be flattened into a single unified layer. In an embodiment, the flattened container image can be used to generate a container base image and encrypted to prevent access to the underlying layers of the container base image.

In an embodiment, container sensitive data protection engine 104 can generate a VM Pod overlay from a VM root file system and related container images as read-only container base images. In another example, container sensitive data protection engine 104 can organize multiple container base images into a VM Pod. The VM Pod containing the flattened containers can be overlayed to create an overlay image and the root filesystem image for the VM Pod. In an embodiment, container sensitive data protection engine 104 can mount encrypted container base images as an encrypted file system (i.e., the VM Pod overlay root filesystem image). This can allow the containers to execute, manipulate, or access the decrypted information, while staying encrypted within the VM Pod, thus preventing host access to runtime data or filesystem information.

In an embodiment, container sensitive data protection engine 104 can identify the VM Pod overlay image. For example, a VM Pod overlay image may be identified by the SHA 256 hash of the VM Pod overlay. The identity of the VM Pod overlay is the combination of all the container names and/or hash identities of the containers within the VM Pod. Container sensitive data protection engine 104 can determine if an overlay image of the VM Pod exists by comparing the identity of the VM Pod to that of other VM pods in container registry or another database. If it is determined the VM Pod identity does not exist within the database or container registry, the VM Pod overlay image can be generated.

Container registry 106 is a database that stores container images. Container registry 106 can be a commercial container database with container images that are safe to use. Container registry 106 can have multiple versions of container images, each with multiple layers within a union file system. In an embodiment, container registry 106 can be a public or private database in which container sensitive data protection engine 104 can retrieve container base images. Non-limiting examples of public container registries include IBM® cloud container registry, Docker® Hub, Amazon® elastic container registry, and Azure® Container Registry.

Figure 2:
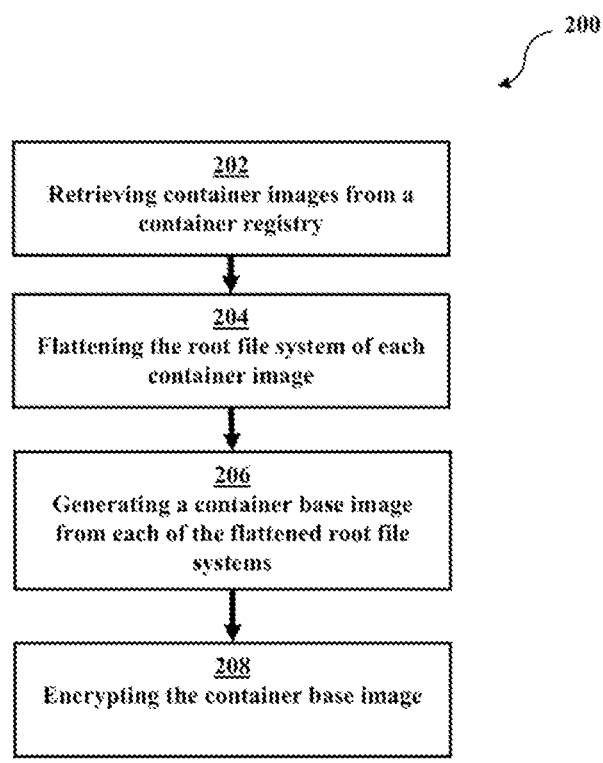
FIG. 2 is a flowchart of a method for protecting container sensitive data from host access, generally designated 200, in accordance with an embodiment of the present invention.

FIG. 2 is a flowchart depicting method 200 for container sensitive data protection. At step 202, container sensitive data protection engine 104 retrieves one or more container images from a container registry, such as container registry 106. At step 204, container sensitive data protection engine 104 flattens a root file system of the retrieved container images. At step 206, container sensitive data protection engine 104 generates a container base image for each flattened container image. At step 208, container sensitive data protection engine 104 encrypts each generated container base image.

Figure 3:
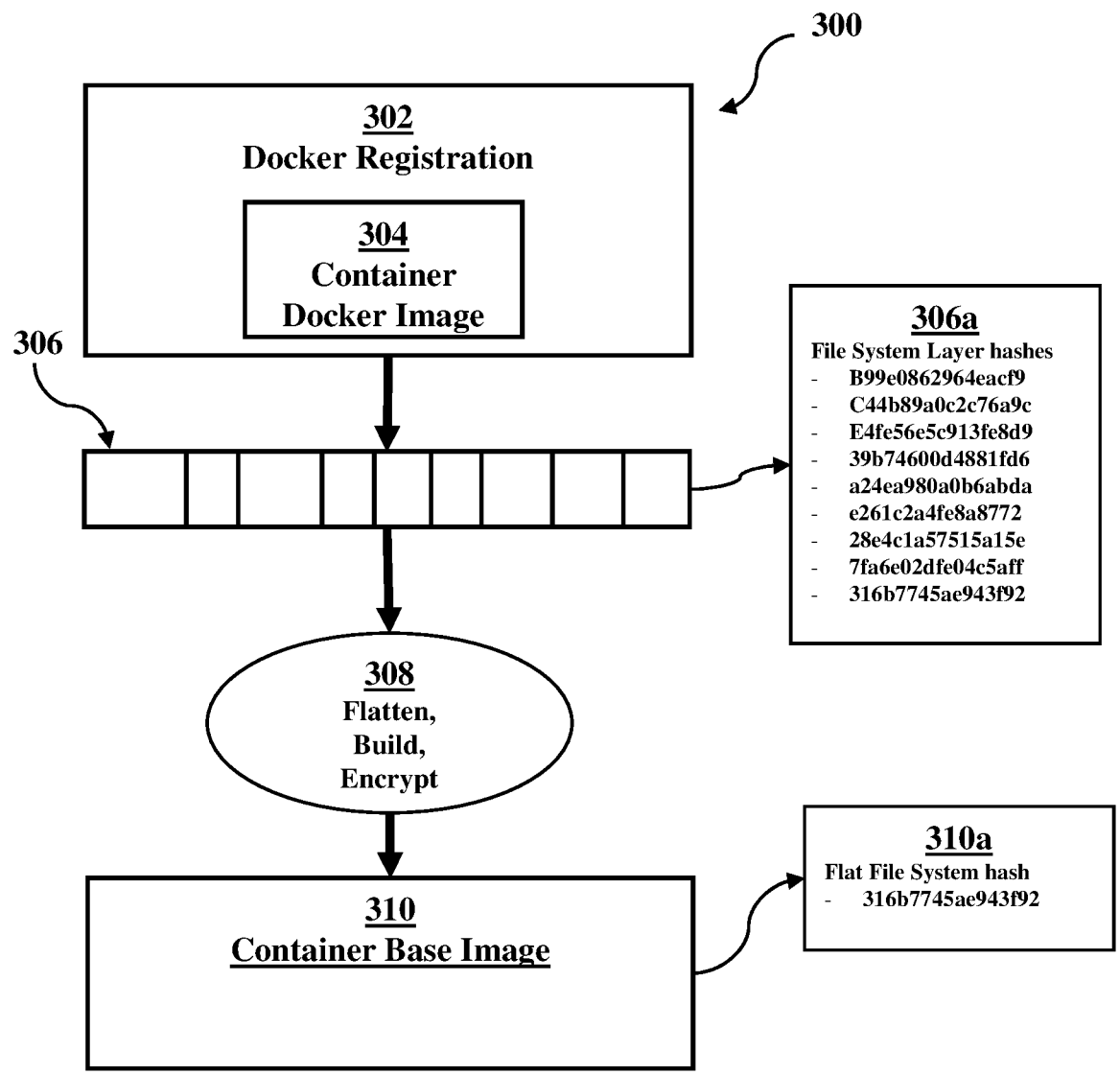
FIG. 3 is a block diagram depicting a container base image build, generally designated 300, in accordance with an embodiment of the present invention.

FIG. 3 is a depiction of a container base image build 300 according to an embodiment of the invention. Docker Registration 302 can be a docker database, such as container registry 106 in FIG. 1. Container Docker Image 304 can be an image of a container compatible with a docker environment. 306 is a depiction of multiple filesystem layers that can be present within container docker image 304. 306a is the file system layer hashes that can be categorized, and which can represent the multiple filesystem layers of the container docker image. In an embodiment, file system layer hashes 306a can be the encrypted version of the file system layers. 308 can be a representation of some of the actions or steps involved in method 200 of FIG. 2, such as, for example, flattening the file system layer, building the container base image, and encrypting the container base image. Container base image 310 is the result of the actions of 308. 310a is a depiction of the hash or encryption of container base image 310.

FIG. 4 is a graphical depiction of a VM run with a VM overlay base image within worker node 400. It should be noted within worker node 400 are dotted lines with the terms read/write and read only beneath them. The dotted line with read/write below it depicts that the boxes within it can be edited in read/write mode. While the dotted line with read only beneath it depicts the boxes within that section of worker node 400 cannot be edited, but only operated within a read only mode.

Continuing with FIG. 4, worker node 400 can be a computing system such as server 102. In an embodiment, Container A 404 and Container B 406 can have independent separate instances operational on Pod A (VM) 402, Pod B (VM) 408, and Pod C (VM) 410. An image of each Pod within worker node 400 can be generated resulting in VM Image A 412 corresponding to Pod A (VM) 402, VM Image B 414 corresponding to Pod B (VM) 408, and VM Image C 416 corresponding to Pod C (VM) 410. Each of the VM images can be operational and be changed and edited in read/write mode within worker node 400. VM Image A 412, VM Image B 414 and VM Image C 416 can be overlayed on one another resulting in VM overlay base image 418. The edits within the VM images are flattened within VM root filing system image 420. The flattened root filing system contains all of the modifications which were made to the VM images in the read/write mode. The file system image of Container A 404 and Container B 406 with the modifications can be built, resulting in Container A image filesystem 422 and Container B image filesystem 424, respectively. It should be noted this is a non-limiting embodiment of a VM running with one or more VM overlay base images. Multiple worker nodes other than worker node 400 can be operational and operate within read/write mode and read only mode to flatten a VM root file system image within the VM environment.

Figure 5:
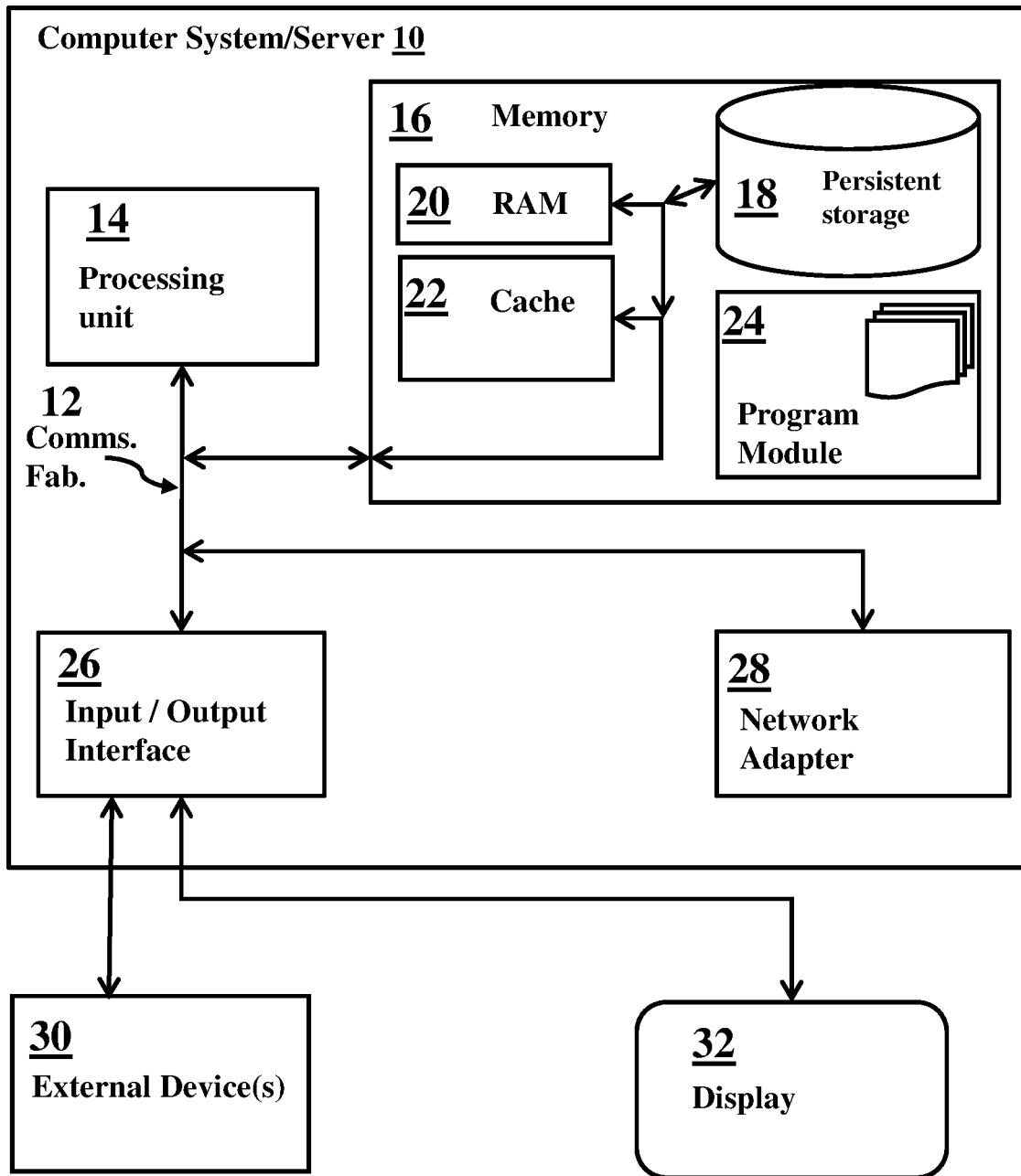
FIG. 5 is a functional block diagram of an exemplary computing system 10 within a container sensitive data protection system, in accordance with an embodiment of the present invention.

FIG. 5 depicts computer system 10, an example computer system representative of server 102. Computer system 10 includes communications fabric 12, which provides communications between processing unit 14, memory 16, persistent storage 18, network adaptor 28, and input/output (I/O) interface(s) 26. Communications fabric 12 can be implemented with any architecture designed for passing data and/or control information between processors (such as microprocessors, communications, and network processors, etc.), system memory, peripheral devices, and any other hardware components within a system. For example, communications fabric 12 can be implemented with one or more buses or a crossbar switch.

Memory 16 and persistent storage 18 are computer readable storage media. In an embodiment, memory 16 includes random access memory (RAM) 20. In general, memory 16 can include any suitable volatile or non-volatile computer readable storage media. Cache 22 is a fast memory that enhances the performance of processing unit 14 by holding recently accessed data, and data near recently accessed data, from memory 16.

Program instructions and data used to practice embodiments of the present invention may be stored in persistent storage 18 and in memory 16 for execution by one or more of the respective processing units 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network Adaptor 28, in these examples, provides for communications with other data processing systems or devices. In these examples, network adaptor 28 includes one or more network interface cards. Network Adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface(s) 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor, touchscreen, and/or augmented virtual reality device.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
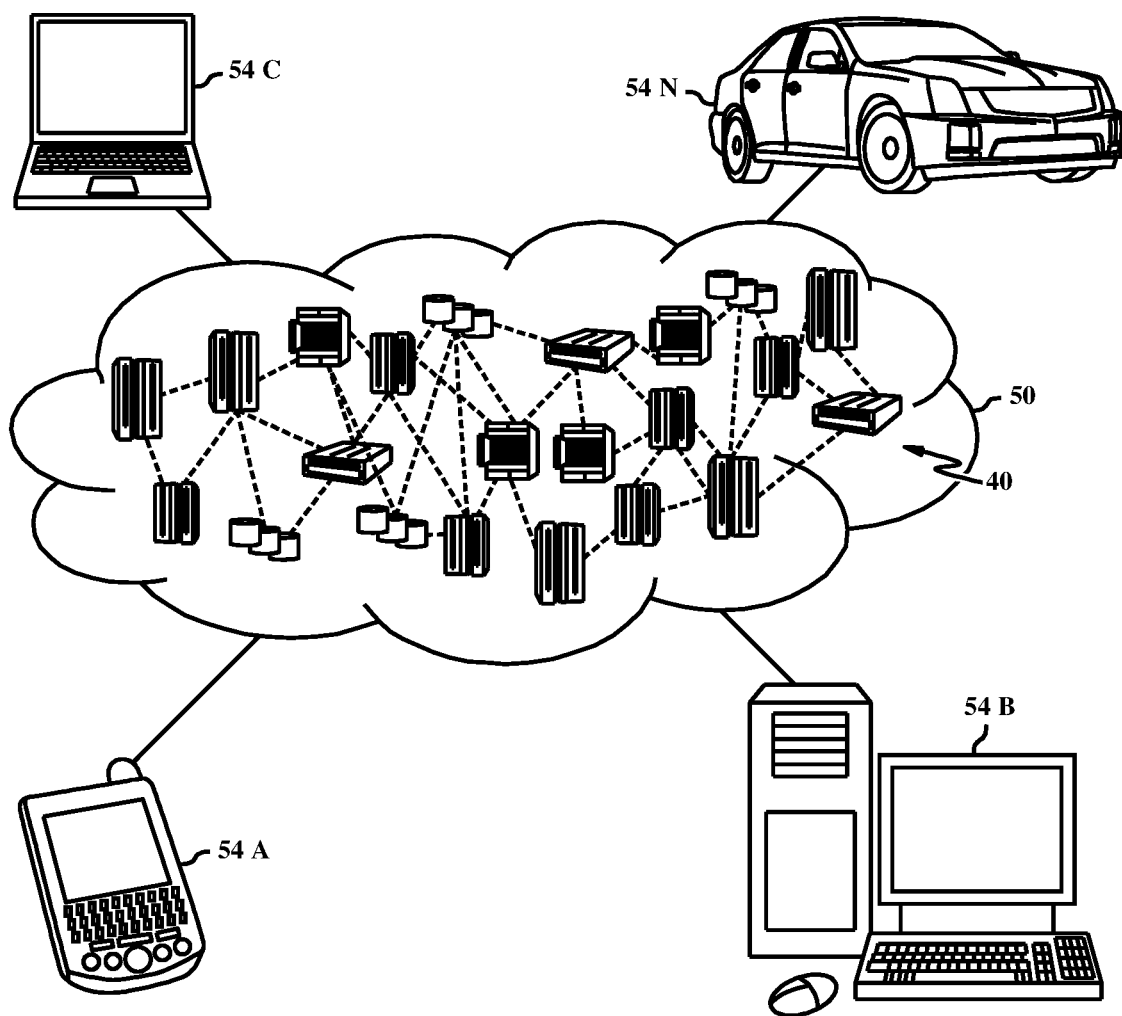
FIG. 6 is a diagram depicting a cloud computing environment 50, in accordance with an embodiment of the present invention.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
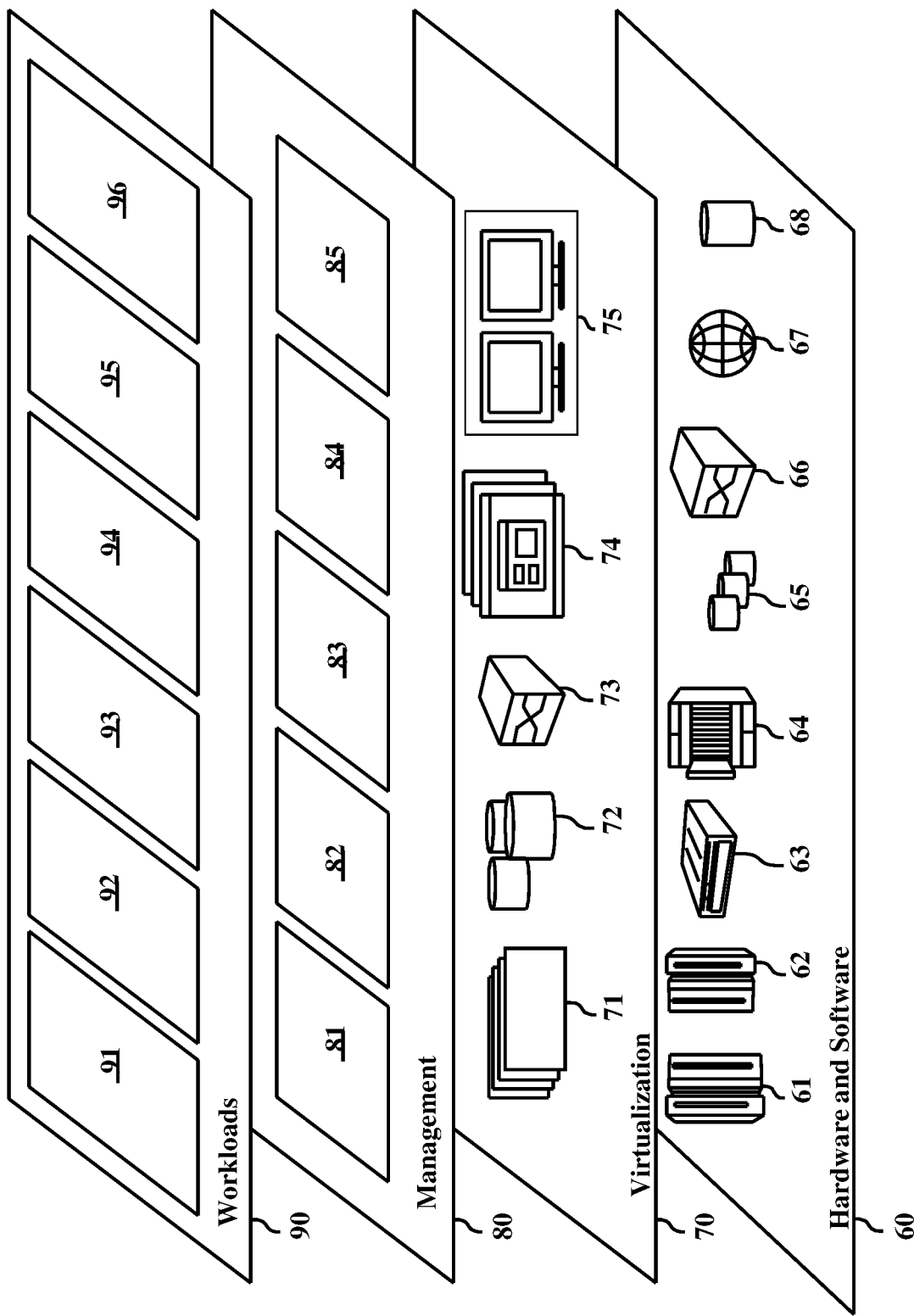
FIG. 7 is a functional block diagram depicting abstraction model layers, in accordance with an embodiment of the present invention.

Referring now to FIG. 7, a set of functional abstraction layers provided by cloud computing environment 50 (depicted in FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and protecting container image and runtime data 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

What is claimed is:

1. A computer-implemented method for protecting container image and runtime data from host access, the method comprising:

retrieving, by a processor, one or more container images from a container registry, wherein the one or more container images are based on a root file system comprised of one or more layers;

flattening, by the processor, each of the one or more container images of the root file system into a single layer;

generating, by the processor, a container base image for each flattened container image;

building, by the processor, a virtual machine overlay base image based, at least in part, on one or more of the generated container base images;

sharing, by the processor, the virtual machine overlay base image based, at least in part, on a dynamic sharing policy; and encrypting, by the processor, each generated container base image.

2. The computer-implemented method of claim 1, wherein building the virtual machine overlay base image further comprises:

generating, by the processor, an identity for the virtual machine overlay base image based, at least in part, on a respective identity of each container operational on the virtual machine overlay base image;

determining, by the processor, if the generated identity for the virtual machine overlay base image exists within the container registry; and responsive to determining that the generated identity for the virtual machine overlay base image does not exist within the container registry, publishing the virtual machine overlay base image within the container registry.

3. The computer-implemented method of claim 1, wherein the virtual machine overlay base image is shared within at least one of the following: container pod, deployment, or namespace.

4. The computer-implemented method of claim 1, wherein the root file system of the one or more retrieved container images is a union file system.

5. A computer system for protecting container image and runtime data from host access, the system comprising:
- a memory; and
- a processor in communication with the memory, the processor being configured to perform operations to:
  - retrieve one or more container images from a container registry, wherein the one or more container images are based on a root file system comprised of one or more layers;
  - flatten each of the one or more container images of the root file system into a single layer;
  - generate a container base image for each flattened container image;
  - build a virtual machine overlay base image based, at least in part, on one or more of the generated container base images;
  - share the virtual machine overlay base image based, at least in part, on a dynamic sharing policy; and
  - encrypt each generated container base image.

6. The computer system of claim 5, wherein building the virtual machine overlay base image further comprises operations to:
- generate an identity for the virtual machine overlay base image based, at least in part, on a respective identity of each container operational on the virtual machine overlay base image;
- determine if the generated identity for the virtual machine overlay base image exists within the container registry; and
- responsive to determining that the generated identity for the virtual machine overlay base image does not exist within the container registry, publish the virtual machine overlay base image within the container registry.

7. The computer system of claim 5, wherein the virtual layer base overlay image is shared within at least one of the following: container pod, deployment, or namespace.

8. The computer system of claim 5, wherein the root file system of the one or more retrieved container images is a union file system.

9. A computer program product for protecting container image and runtime data from host access having program instructions embodied therewith, the program instructions executable by a processor to cause the processors to perform one or more operations, comprising:
- program instructions to retrieve one or more container images from a container registry, wherein the one or more container images are based on a root file system comprised of one or more layers;
- program instructions to flatten each of the one or more container images of the root file system into a single layer;
- program instructions to generate a container base image for each flattened container image;
- program instructions to build a virtual machine overlay base image based, at least in part, on one or more of the generated container base images;
- program instructions to share the virtual machine overlay base image based, at least in part, on a dynamic sharing policy; and
- program instructions to encrypt each generated container base image.

10. The computer program product of claim 9, wherein building the virtual machine overlay base image further comprises:
- program instructions to generate an identity for the virtual machine overlay base image based, at least in part, on a respective identity of each container operational on the virtual machine overlay base image;
- program instructions to determine if the generated identity for the virtual machine overlay base image exists within the container registry; and
- program instructions to responsive to determining that the generated identity for the virtual machine overlay base image does not exist within the container registry, publish the virtual machine overlay base image within the container registry.

11. The computer program product of claim 9, wherein the root file system of the one or more retrieved container images is a union file system.

* * * * *